US006048921A

United States Patent [19]

White et al.

[11] Patent Number: 6,048,921

[45] Date of Patent: *Apr. 11, 2000

[54] METHOD FOR APPLYING CONVERSION COATING WITH WICK APPLICATOR

[75] Inventors: Robert Ashton White, Nicholson; Lester Steinbrecher, North Wales, both of Pa.

[73] Assignee: Henkel Corporation, Plymouth Meeting, Pa.

[ * ] Notice: This patent is subject to a terminal disclaimer.

[21] Appl. No.: 08/909,662

[22] Filed: Aug. 12, 1997

Related U.S. Application Data

[60] Continuation of application No. 08/487,336, Jun. 7, 1995, abandoned, which is a division of application No. 08/363,116, Dec. 23, 1994, abandoned, which is a division of application No. 08/038,033, Mar. 29, 1993, which is a continuation of application No. 07/796,154, Nov. 21, 1991.

[51] Int. Cl.$^{7}$ ................................ C08K 5/02; B05C 5/02

[52] U.S. Cl. .......................... 524/462; 524/263; 524/463; 427/142; 427/407.1; 427/385.5; 427/399; 427/429; 148/258; 148/280

[58] Field of Search .................................... 524/462, 463, 524/263; 427/407.1, 142, 385.5, 399, 429; 148/258, 280

[56] References Cited

U.S. PATENT DOCUMENTS

| | | | |
|---|---|---|---|
| 2,438,877 | 3/1948 | Spruance, Jr. | 148/258 |
| 2,796,370 | 6/1957 | Ostrander et al. | 148/268 |
| 2,825,697 | 3/1958 | Carrol et al. | 252/389.1 |
| 2,851,385 | 9/1958 | Spruance, Jr. et al. | 148/268 |
| 3,185,596 | 5/1965 | Schiffman | 148/251 |
| 4,146,410 | 3/1979 | Reinhold | 148/268 |
| 4,148,670 | 4/1979 | Kelly | 148/247 |
| 4,191,596 | 3/1980 | Dollman et al. | 428/450 |
| 4,313,769 | 2/1982 | Frelin et al. | 148/247 |
| 4,486,241 | 12/1984 | Donofrio | 148/262 |
| 4,595,424 | 6/1986 | Hacias | 148/241 |
| 4,717,431 | 1/1988 | Knaster et al. | 428/628 |
| 4,838,957 | 6/1989 | Miyamoto et al. | 148/241 |
| 4,961,794 | 10/1990 | Miyamoto et al. | 148/262 |
| 5,218,031 | 6/1993 | Wayder et al. | 524/376 |
| 5,702,759 | 12/1997 | White et al. | 427/142 |

*Primary Examiner*—Marion McCamish
*Assistant Examiner*—John J. Guarriello
*Attorney, Agent, or Firm*—Roylance, Abrams, Berdo & Goodman, L.L.P.

[57] ABSTRACT

The present invention relates to an applicator for flowable materials which comprises a generally cylindrical housing having a chamber, a discharge opening, a wick projecting through said discharge opening, and a projecting structure for shielding the user from flowable materials and for preventing placement of the applicator in inappropriate receptacles. Further, the present invention relates to a storage and shipping rack for said applicators and to a method of dispensing flowable materials onto a surface. Preferably, the applicator is filled with metal coating and treating compositions such as aqueous acidic chromate compositions. Most preferably, the acidic compositions contain a very low concentration of a fluorinated surfactant.

12 Claims, 10 Drawing Sheets

METHOD FOR APPLYING CONVERSION COATING WITH WICK APPLICATOR

CROSS-REFERENCE TO RELATED APPLICATION

This is a continuation of application Ser. No. 08/487,336 filed Jun. 7, 1995 now abandoned, which is a division of application Ser. No. 08/363,116, filed Dec. 23, 1994 now abandoned, which is a divisional of application Ser. No. 08/038,033 filed Mar. 29, 1993 which is a continuation of application Ser. No. 07/796,154 filed Nov. 21, 1991.

BACKGROUND OF THE INVENTION

1. Field of the Invention

This invention relates to the application of flowable materials such as liquids and flowable solids to surfaces and more particularly, to an improved applicator device, method of application, and container/dispenser for such applicators. More particularly, the present invention relates to equipment and processes for the application of hazardous chemicals, and more particularly, to a method and a hand-held pen-type applicator for use in applying corrosive, hazardous, or other chemical coatings solutions to scratched surfaces, and even more particularly, to such a method and applicator for touching up scratches on conversion coated aluminum surfaces.

2. Description of the Prior Art

In industrial use, there are many methods of applying flowable materials to surfaces and many types of applicators for this purpose. Among such methods, there are spraying systems and pumping systems, immersion baths and the like. As well, different types of applicators include fibrous markers, felt tip pens, capillary tube pens and the like.

Continuing efforts have been made in the past to improve the safety of such items when the flowable material is of a hazardous, toxic, or offensive nature. Particularly, in the field of metal coating and treating, such efforts have involved developing systems where the user is physically removed from the article to be treated or coated by employing such devices as spray-booths and immersion baths. A major drawback of such a system is that minor defects in the coating or treatment are difficult to repair and require that the entire article be completely reimmersed or recoated. This process can be particularly time consuming and expensive, since a small defect in the coating will require the expenditure of enough chemical or flowable material to re-treat the entire article.

Typically, aluminum or other metal parts for use in commercial and military systems are fabricated, and then their surfaces are chemically treated to prevent corrosion, using conventional batch processing techniques. This chemical treatment process is quite important in applications that require electrical and thermal insulation or conductivity, for example. After chemical treatment, however, many parts become scratched during subsequent handling or processing steps, which remove a portion of the chemically treated corrosion protection layer from the surface of the parts. Consequently, it becomes necessary to treat the scratched areas to return the surfaces to a condition of complete chemically treated corrosive protection.

The conventional method of repairing the scratched surface is to obtain a bottle of coating solution, and then using cotton balls, Q-tips, rags, or sponges, and the like, rub or otherwise apply the coating solution over the scratched areas until the scratch is fully coated. In many cases, the shape of the parts creates many problems in applying the coating solution to the surface.

The coating solution may be and often is a corrosive, hazardous material, since it may contain, for example, quantities of chromic acid, fluoride, ferricyanide, and ferrocyanide. Conventional procedures typically apply excessive quantities of the coating solution, and often result in spillage, creating a hazardous condition in the treatment area. The conventional process is messy, and much of the coating solution is wasted. The cotton balls, Q-tips, rags, or sponges, and the like which are used to apply the coating solution or to clean it up, become hazardous waste as a result of their use and thus present disposal problems.

Generally the coating solutions or flowable materials are of two types: those that require rinsing to remove excess coating material, and those that do not require rinsing. The former may require rinsing because they tend to form crystals that produce an undesirable surface roughness and present a hazard because these crystals, as well as any residual coating, are generally highly active, i.e., pH 1.5–4.5. Rinsing is necessary but creates rinse water that is corrosive because it is acidic, and may be toxic as well, and this poses a disposal problem. No-rinse (NR) coating materials do not form crystals, can be formulated to be self-levelling, and do not require rinsing for those reasons.

Prior to the advent of the present invention, industrial users of metal treating and coating technologies were unable quickly and efficiently to correct minor defects in a coating or treatment of a metal surface because the nature of the chemicals used to treat and coat metal surfaces makes them difficult to use safely by a person because of the risk of exposure of the person to the chemical. As well, devices for safely handling and storing such small quantities of offensive chemicals were simply unavailable to the industry.

Accordingly, it is an objective of the present invention to provide a method and apparatus that eliminates the above-mentioned problems. Another objective of the present invention is to provide for an environmentally safe method and apparatus to touch up and repair scratched parts with hazardous, toxic, corrosive, or otherwise offensive chemical solutions. It is a further objective of the present invention to reduce the repair cycle time in touching up and repairing scratched parts with such chemical solutions. It is a specific objective of the present invention to provide for such a method and means for touch up and repair of metal parts with such coating solutions.

The present invention provides an improved device for the safe handling and application of flowable coating on treating materials onto surfaces.

Further, the invention provides industry with a method safely and efficiently to assist in the coating of a surface.

The present invention also provides an applicator device with a novel safety collar to prevent injury to the users of dangerous industrial chemicals that can be efficiently employed by the user in small quantities.

Further, the present invention also provides the metal treatment industry with an improved method of repairing minor defects that occur in metal coatings and treatments and hence reduces the high costs associated with having to recoat and retreat metal articles.

Further, the present invention provides industry with an improved applicator device for the coating of aluminum surfaces with an aqueous acidic chromate and other conversion coating compositions for treating steel and galvanized steel, for example, acidic zinc and other iron phosphate compositions. Further, the present invention provides an improved method of treating metal surfaces with aqueous acidic chromate compositions.

Also, the present invention provides industry with an improved device for storing and dispensing applicator devices with coating surfaces with flowable materials.

The foregoing has outlined some of the uses and advantages of the present invention. These uses and advantages should be construed to be merely illustrative of some of the more pertinent features and applications of the invention.

Accordingly, other aspects and advantages, and a fuller understanding of the invention, may be had by referring to the Summary of the Invention and to the Detailed Description describing some of the preferred embodiments in addition to the scope of the invention defined by the claims taken in conjunction with the accompanying Drawings.

SUMMARY OF THE INVENTION

In accordance with one embodiment of the method of the present invention, a liquid dispensing tip is brought in contact with the surface to be touched up, and it is rubbed over the desired area to dispense a controlled amount of the solution on the desired areas of the surface.

The method of the present invention in one embodiment employs an applicator that uses a felt tip or analogous marker containing a coating solution or other appropriate chemical solution. The applicator and solution are used to touch up small areas and or scratches on treated metal surfaces. The applicator and method of the present invention eliminates the hazardous waste normally produced in the touch up process, and substantially reduces the number of process steps and time involved. The method and applicator of the present invention provide hand held, self feeding means for performing coat touch-up. The applicator is easily stored, produces no spillage, and requires less work area and process space for touch up. The present applicator and method reduce solution waste by up to 99% -the only waste material that is thrown away is an expired or empty applicator.

The applicator and method of the present invention may be used to treat aluminum, and other metals. The present applicator and method simplify the touch up process and reduce repair cycle time by allowing application of a treating solution regardless of the orientation or location of the scratched surface. In most cases, the applicator allows touch up without disassembly of the article. The present applicator and method may be employed in pre-paint processes in the automotive, marine, aircraft, coil coating and general industries.

The invention may be incorporated into applicator apparatus for transferring flowable materials from a container or cartridge to a surface.

In one embodiment, the applicator includes a housing assembly, an applicator wick, and a protruding guard structure which prevents the inadvertent insertion of the applicator into a garment pocket or other inappropriate place. The housing assembly has a distal end and a proximal end. The housing is formed with a chamber for storing the flowable material. The distal end is formed with an input port for filling the chamber with flowable material, and the proximal end has a discharge opening through which the flowable material can pass onto the intended surface. However, it is most preferred to have the distal end of the pen welded shut when the housing is manufactured. The chamber is then filled by introducing flowable materials into the applicator via the discharge port. Such a welded structure means that the construction may be more expensive, but it is safer. For less corrosive coatings, a less expensive construction could make use of a press fit but leakproof seal.

To facilitate the discharge of flowable coating material, a wick is disposed within the discharge opening of the housing and is in contact with the flowable coating material within the chamber. A portion of the wick projects through the discharge opening for contacting the surface on which the flowable material is the be applied. For safety, a guard collar can be integrally molded as part of the housing assembly or can be a separate piece of material that is secured to the housing by an interference fit or by the use of many types of adhesives known in the art. Thus, the guard collar may be rigid or flexible, and may be fixedly secured to the housing or slidably mounted on it.

Specifically, the guard collar can be in the shape of a disk, or a series of protruding spokes, or a ring. The safety collar preferably is made of transparent material to allow the user to view the discharge of flowable material onto the intended surface. The radius encompassed by the collar is preferably at least twice the radius of the housing, preferably 3–4 times,in order for the size of the collar to prevent a user from accidentally or inadvertently inserting the applicator into a garment pocket or other inappropriate place, to safeguard against the risk to the user of exposure to the chemical or material within the applicator, by inhibiting the applicator from being stored in a manner that would permit chemical residue or leakage to contact the clothing or body of a user. When the collar is in the shape of a solid disk, it also serves the purpose of shielding the user from the material that is being applied to the surface.

In one embodiment, the collar is fixedly attached to the housing by means of an adhesive, a weld or fusion bond, or by an interference fit. However, the user may find it advantageous to be able to adjust the position of the safety collar on the housing. Therefore, in another embodiment, the collar is slidably mounted on the housing by a loose, friction fit, thereby allowing the user to slide the collar along the length of the housing.

In another embodiment of the invention, caps are placed on each end of the housing. The cap on the distal end of the housing is removed to charge the chamber within the housing with the desired flowable material. The cap may optionally have a catch on it, of any type known in the art, to avoid non-deliberate opening of the cap, which will avoid accidental contact with the flowable material by the user. The cap on the proximal end of the housing, which encloses the discharge opening, may optionally have a catch of any type known in the art that will avoid unintended removal of the cap. In lieu of a catch, each of the above mentioned caps may releasably attach to the housing by either screwing onto the housing, by threading the housing and the cap, or by way of a friction or elastic fit.

In another embodiment of the invention, a valve is placed between the wick and the chamber. The valve can be moved between open and closed positions. The valve comprises a spring placed in the chamber which biases a sealing member against the discharge opening. The wick depends from the sealing member and projects through the discharge opening. By depressing the wick against the surface on which flowable materials are to be applied, the sealing member is slightly dislodged, placing the valve in an open position, allowing the flowable material to pass into the discharge port and be conducted along the wick to the surface. When the pressure of the wick against the surface is removed, the sealing member returns to its position in the discharge opening, placing the valve in the closed position, and stopping the movement of flowable material out of the chamber.

In a most preferred embodiment, the valve assembly and the wick are manufactured as a single, integrated component. The housing, which is permanently fused shut at the distal end, is filled by introducing flowable material into the chamber via the discharge port. The valve and wick assembly is then inserted into the discharge port. The valve and wick assembly is permanently secured in the discharge port by means of an adhesive substance, a weld, or by an interference fit. For simplicity, an interference fit is preferred.

As to the flowable material that can be dispensed by the applicator for metal treating and coating, and especially for the conversion coating of aluminum surfaces, the applicator is charged with a flowable material suitable for preventing corrosion of the metal surface. Alternately, a material suitable for treating a metal surface prior to subjecting the metal surface to a coating process may be desired. For these purposes, it is preferred to charge the applicator with one of the following: a non-accelerated chromium chromate composition in an aqueous acidic solution; a chromium chromate composition in an aqueous acidic solution accelerated with ferricyanide, ferrocyanide, or molybdate; or a chromium phosphate composition in an aqueous acidic solution; depending on the nature of the treatment. As well, the applicator can be charged with a composition such as an acidic zinc phosphate solution for use in coating cold-rolled steel or galvanized steel.

In further embodiments of the invention for use in metal treating and coating, any of the previously identified chromate compositions is mixed with a fluorinated-type surfactant (such as a Fluorad® surfactant) to improve the flow and coating properties, or flow ability of the metal treatment composition. Fluorad® surfactants are preferred as it has been found that they are highly stable in an acidic environment containing chromates. "Fluorad" is the trademark of the Industrial Chemical Products Division of Texaco Chemical Co., for its line of fluorochemical surfactants.

A further aspect of the invention is a rack for storage and transportation of a large number of the applicator devices. In one embodiment, the rack may have the lower end support spindle attached to a base plate. An upper support disk is secured to the support spindle at its upper end. A lower support disk is attached to the spindle at a point in between the upper base plate and the base plate. Each support disk has a number of circular cutouts, or cutaways, spaced evenly around the edge of the disk. The support disks are spaced apart sufficiently to receive an applicator device which is inserted upside-down into cutaways that are aligned on the upper and lower support disks. The safety collar of each applicator rests on the lower support disk, with one end of the housing assembly located within the cutaway and the second end of the housing located within an aligned, corresponding cutaway in the upper support disk.

In a preferred embodiment, the rack comprises a cylindrical housing with cylindrical cavities formed in its periphery. The depth and diameter of each cavity is sufficient to accommodate a single applicator. An applicator is inserted, in an inverted manner, into each cavity. Alternately, each cavity may have a diameter large enough to accommodate the applicator housing. To accommodate the collar of each applicator, a groove is formed in the cylindrical housing.

The present invention employs, in one embodiment, a hand-held pen applicator to apply a measured amount of a hazardous chemical solution, for example, to a surface, as the dispensing tip is applied to the surface. The applicator may be similar to a well-known conventional "felt tip" type marking pen or similar structure, but is filled with a hazardous chemical solution. A label is preferably provided on the applicator that identifies the hazardous chemical solution and denotes the shelf-life of the solution.

The present invention contemplates that the size of the solution reservoir and the size and shape of the dispensing tip are chosen to provide the appropriate amount of solution to a desired area of a surface. For example, a relatively narrow tip may be used to touch up a narrow scratch whereas a broader tip may be used to touch up a scratch having a broad surface area.

The foregoing has outlined the more pertinent and important features of the present applicator invention in order that the detailed description of the invention that follows may be better understood, so that the present contribution to the art can be more fully appreciated. Additional features of the invention will be described which form the subject of the claims of the invention. It should be appreciated by those skilled in the art that the specific embodiments disclosed may be readily utilized as a basis for modifying or designing other structures for carrying out the same purposes as the present invention. It should also be realized by those skilled in the art that such equivalent constructions do not depart from the spirit and scope of the invention as set forth in the appended claims.

DETAILED DESCRIPTION OF THE INVENTION

Other than in the operating examples, or where otherwise indicated, all numbers expressing quantities of ingredients or reaction conditions used herein are to be understood as modified in all instances by the term "about." All amounts and percentages are by weight unless expressly stated to be otherwise, and all temperatures are degrees Celsius unless otherwise stated.

Figure 1:
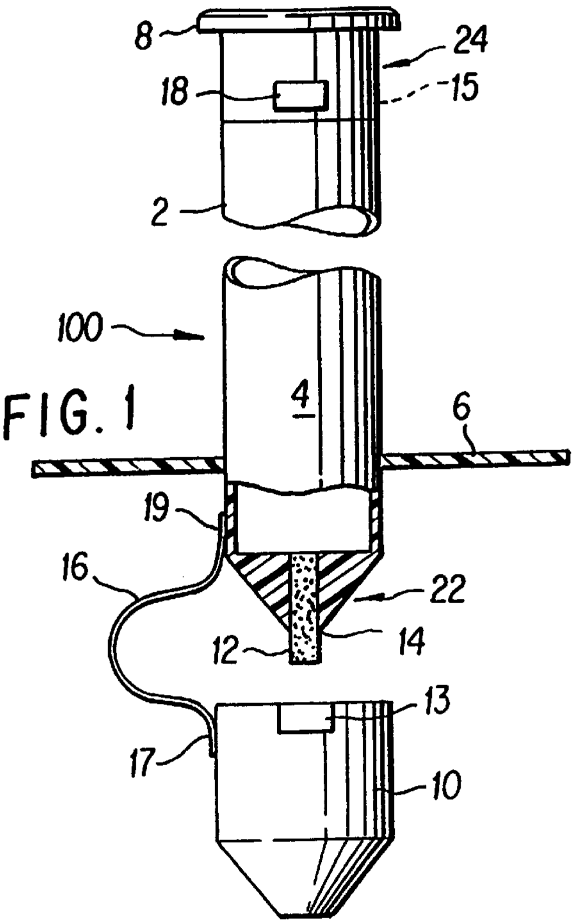
FIG. 1 is a side elevation, partly in vertical section, showing one embodiment of an applicator in accordance with the invention, with a guard disk projecting radially outward from the cylindrical body of the applicator, and with its end cap detached from the proximal end of the applicator and spaced below the applicator tip.

Referring now in detail to the drawings by numerals of reference, where similar reference numerals refer to similar parts throughout, an applicator 100 made in accordance with an embodiment of the invention, as shown in FIG. 1, comprises a generally cylindrical housing 2 having therein a chamber 4. The housing 2 includes a distal end 22 having an aperture 14 which provides communication between the chamber and the outside of the housing, allowing flowable materials to be introduced into the chamber through said aperture. The housing 2 also includes a proximal end 24 having a discharge opening 14 through which flowable materials can be dispensed.

In order to make the housing 2 durable, easy to construct, and inexpensive, many types of plastic are suitable materials of construction. It is, therefore, preferred that each component of the present invention be manufactured from plastic, unless otherwise specified. Further, the housing 2 may be labelled or printed with indicia which identifies the flowable materials within the chamber 4 or any hazards associated with it.

The applicator 100 includes a wick 12 projecting through the discharge port 14 of the proximal end 22 for dispensing flowable materials through the discharge. Preferably, the wick 12 comprises a foraminous material such as polyester or polyethylene which will conduct flowable material from the chamber 4 onto the surface to be treated. An end cap 10 is shown that is releasably attachable to the proximal end 22. To avoid accidental misplacement of the end cap 10, an optional retainer strap 16 may be connected at its distal end 17 to the end cap 10 and at its proximal end 19 to the housing 2. The end cap 10 is shown in FIG. 1 as having a latch 12, of the type known in the art, to prevent accidental removal of the end cap 10. Also shown is an end cap 8 which releasably attaches to the distal end 24 of the housing 2. The end cap 8 is also shown having a latch 18 of the type known in the art, to prevent accidental removal of the end cap 8. The safety collar 6 is a solid disk and is shown projecting from the applicator housing 2.

The safety collar 6 is preferably molded as part of the housing 2 during the fabrication of the housing 2, or the safety collar 6 can be fabricated separately and permanently adhered to the housing 2 by means of adhesives known in the art or by fusing the collar 6 and the housing 2 together using heat. Additionally, the collar 6 may be slidably mounted on the housing 2, by means of a loose friction-fit. Further, although the safety collar 6 may be fabricated from any desired material, it is preferred that it be made of transparent material, such as clear plastic, to enable the user to easily see the point of contact between the applicator and the surface to be treated.

Figure 2:
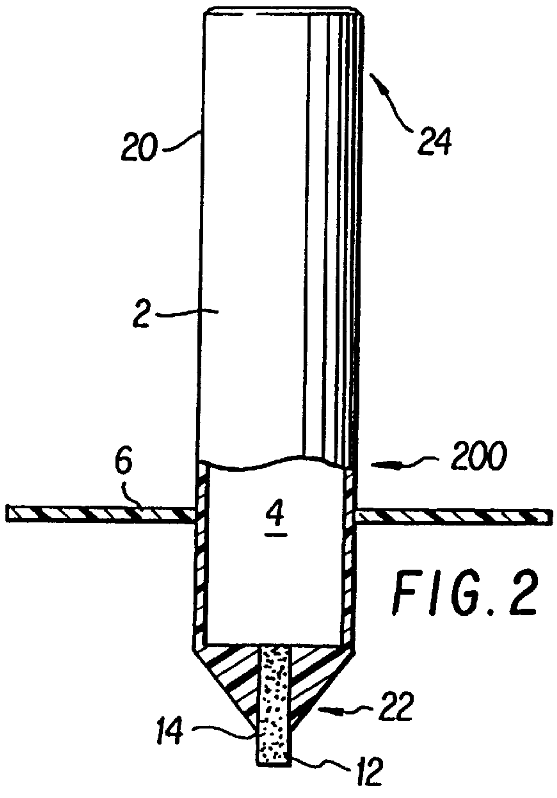
FIG. 2 is a side elevation, partly in vertical section, showing another, similar embodiment of an applicator in accordance with the invention, with the upper end cap integrally molded to the distal end of the applicator.

FIG. 2 shows an alternate embodiment of the invention where the end cap 20 is permanently attached to the distal end 24 of the housing 2. In this embodiment, the applicator is not refillable, as the chamber 4 is filled by the manufacturer and permanently sealed. This embodiment avoids the possibility of accidental leakage of flowable material from the applicator.

Figure 3:
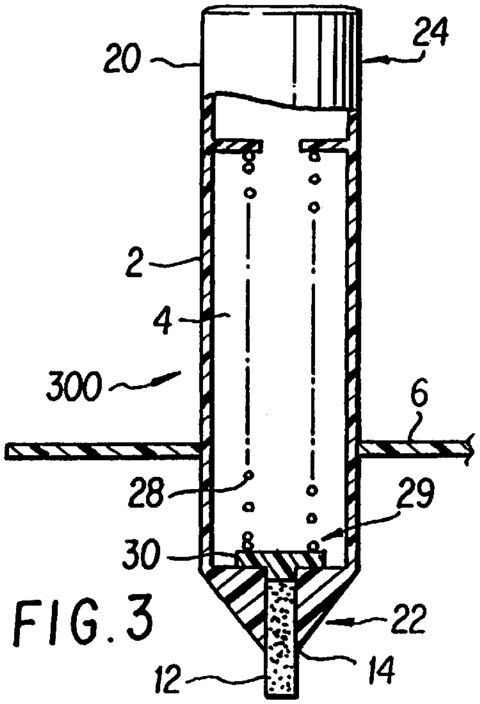
FIG. 3 is a side elevation, partly in vertical section, showing another embodiment of an applicator in accordance with the invention, showing a spring biasing the sealing member into the discharge port, thereby preventing discharge of flowable material.
Figure 4:
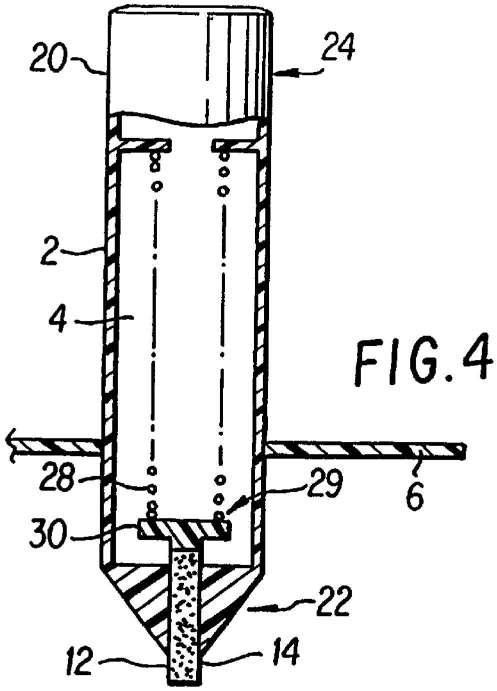
FIG. 4 is a side elevation, partly in vertical section, showing another embodiment of the applicator in accordance with the invention, showing that an upward force exerted on the wick presses the sealing member out of the discharge port and allows flowable material to be discharged from the applicator.
Figure 4A:
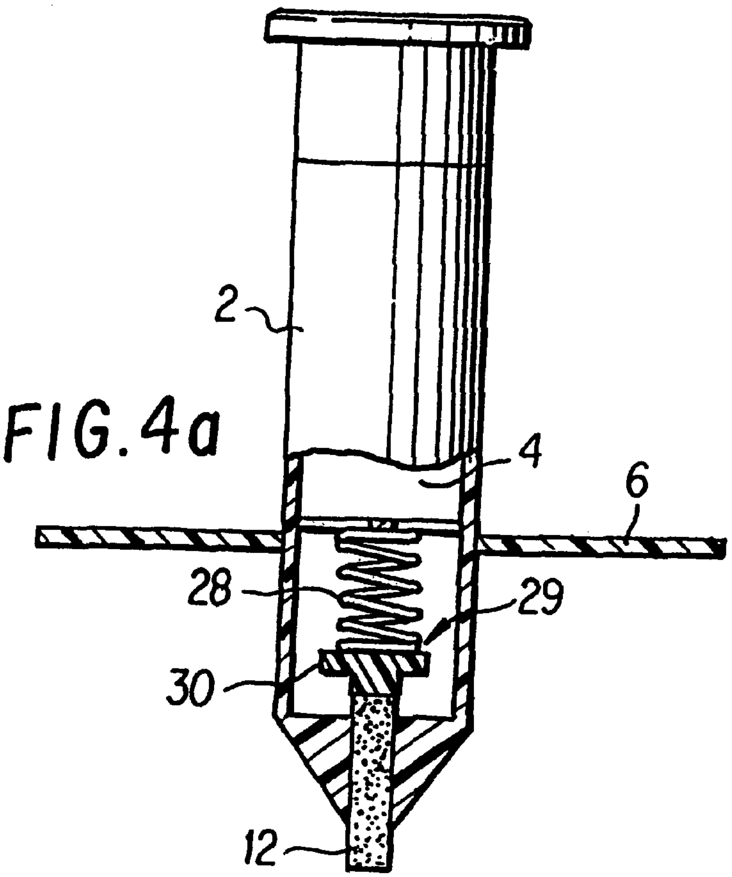
FIG. 4*a* is a side elevation, partly in vertical section, of another embodiment of the applicator in accordance with the invention, showing a horizontal member within the chamber, against which the spring is biased.
Figure 4B:
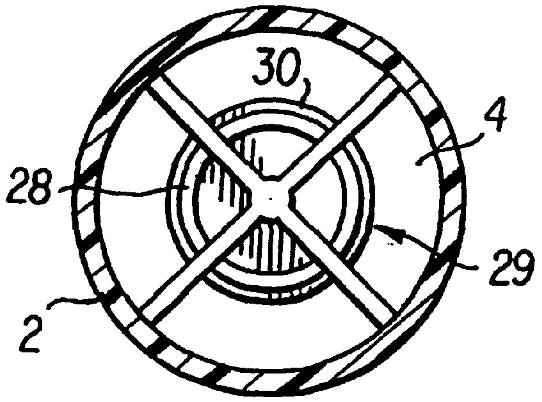
FIG. 4*b* is a top plan view of the chamber of the applicator of the parent invention, showing the horizontal member disposed above the sealing member.

FIGS. 3 and 4 show an alternate embodiment of the present invention in which a valve 29 is disposed within the chamber 4. The valve 29 comprises a spring 28 which biases a sealing member 30 whereby the sealing member 30 engages and closes the discharge opening 14 of the proximal end 22 and thereby prevents communication between the chamber 4 and the exterior of the housing 2. For simplicity and economy, it is preferred that the spring is manufactured from metal.

FIG. 3 illustrates the valve 29 in a closed position. When no force is exerted against the wick 12, the spring 28 biases the sealing member 30 into the discharge opening 14 and prevents communication between the chamber 4 and the outside of the housing 2, and thus preventing the discharge of flowable material.

As shown in FIG. 4, when pressure is exerted against the wick 12, the sealing member 30 disengages and opens the discharge opening 14 of the proximal end 22 allowing communication between the chamber 4 and the exterior of the housing 2 and thereby enabling the dispensing of flowable materials through the discharge opening 14 of the second end 22. The valve 29 shown in FIGS. 3 and 4 is simple and inexpensive to construct.

However, it may be desirable to employ commercially available valves under certain circumstances, such as when using more hazardous chemicals which require more extensive safeguards against leaks. Valves suitable for use in the present invention are described in U.S. Pat. Nos. 4,848,947, 4,792,252, and 4,685,820, each of which is expressly incorporated herein by reference.

Figure 5:
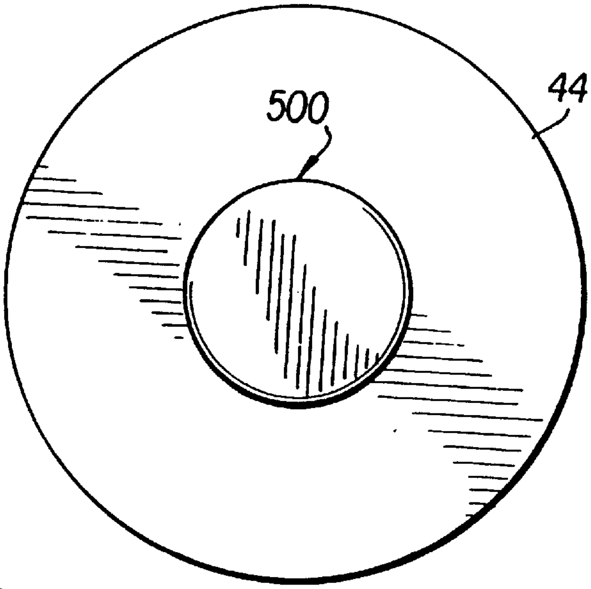
FIG. 5 is a top plan view on an enlarged scale, showing the distal (upper) end of a different embodiment of the applicator of the present invention, showing the guard disk as a solid but transparent disk.
Figure 6:
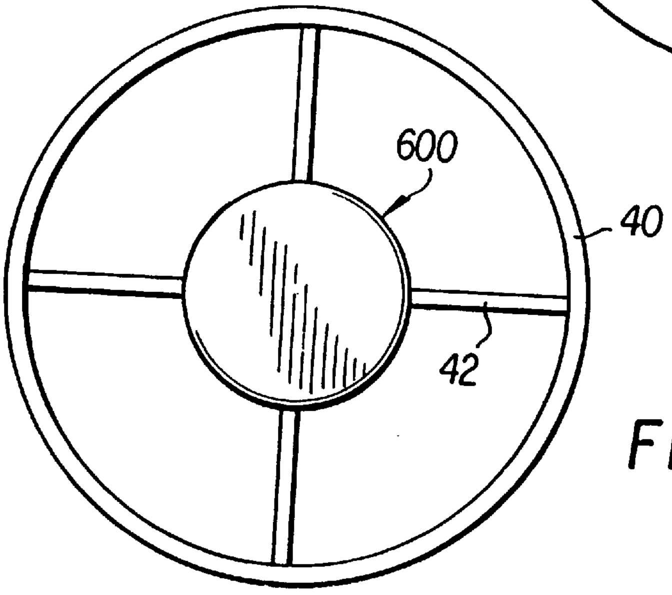
FIG. 6 is a top plan view on the same scale as FIG. 5, showing the distal (upper) end of still another embodiment of the applicator, showing the guard structure as a circular ring which is connected to the cylindrical body of the applicator by four spokes that extend radially from the cylindrical body of the applicator.
Figure 7:
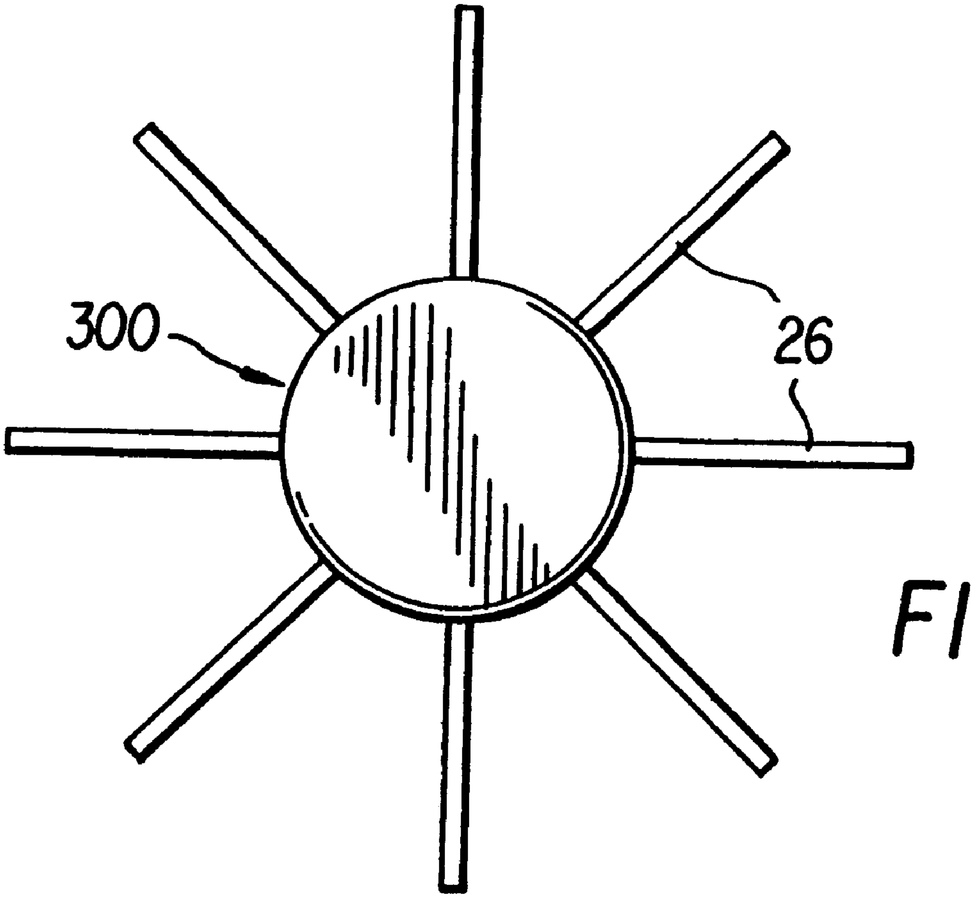
FIG. 7 is a top plan view on the same scale as FIG. 5, showing the distal (upper) end of another embodiment of the applicator, showing the guard structure as light, radially-extending spokes.

FIGS. 5–7 show alternate embodiments of the safety collar 6. FIG. 5 illustrates the safety collar 6 as a solid disk of transparent material, such as clear plastic, attached to the periphery of the housing 2. FIG. 6 illustrates the projecting structure, or safety collar 6, as a circular ring 40 which attaches to the periphery of the housing 2 by a number of connector rods 42. FIG. 7 illustrates the projecting structure or safety collar 6 as a plurality of spokes 26 emanating from said housing 2. FIGS. 5–7 each illustrate a projecting structure 6 which deters the user of the applicator from inserting the applicator 300,500,600 into a garment pocket, such as a shirt pocket, jacket pocket, pants pocket, etc., or other inappropriate receptacle such as a desk drawer, tool box, etc. By so inhibiting the placement or insertion of the applicator into such places, the risk is reduced of accidental exposure to the flowable material contained in the applicator, whether it is of a hazardous nature or not.

Figure 8:
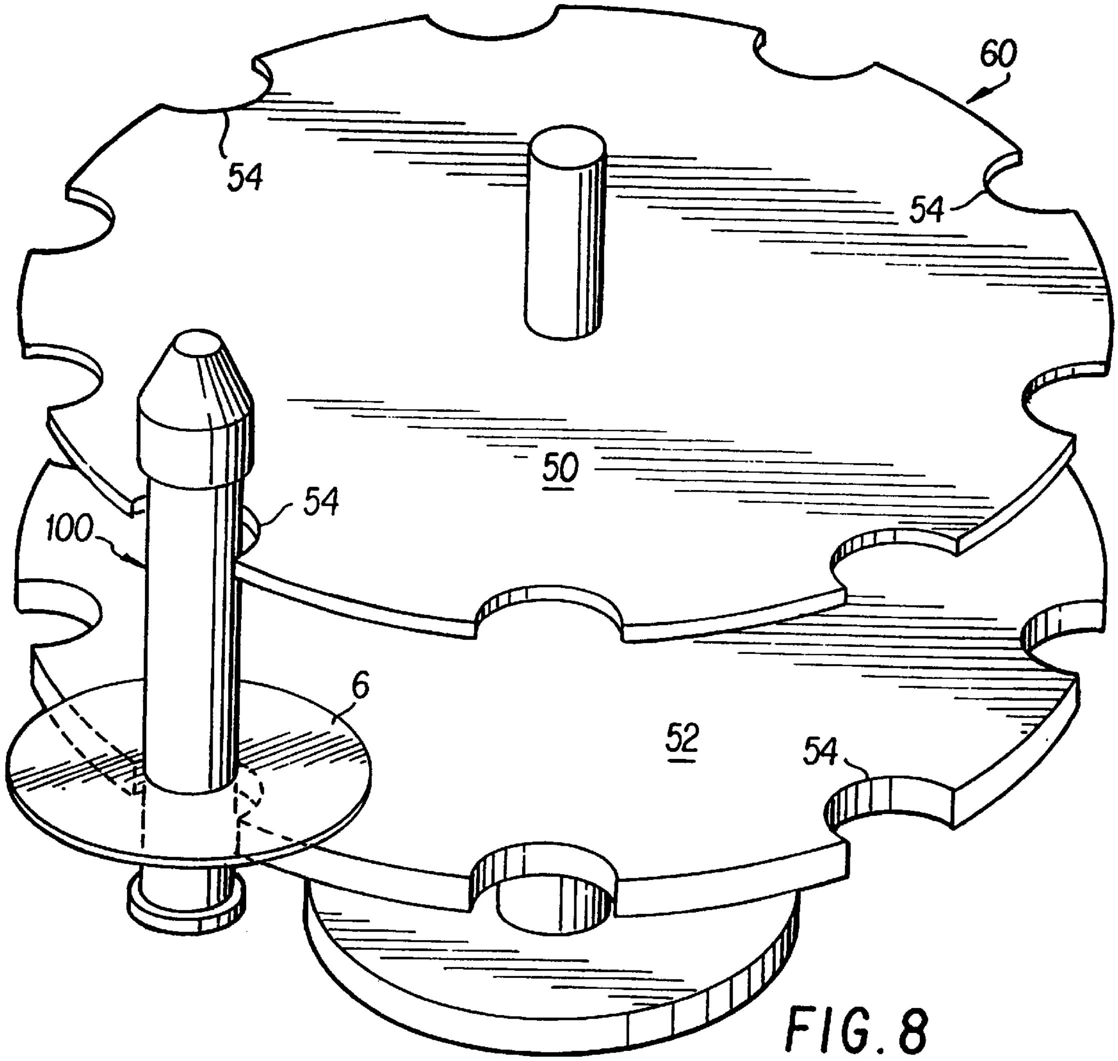
FIG. 8 is a perspective view of a rack according to one embodiment of the present invention, showing a single cavity, with an applicator inserted into a perimetral recess, and with the guard collar resting on a surface about a recess.

FIG. 8 is a perspective view of a rack 60 for storing, transporting, and dispensing applicators 100 in large quantities (only one applicator being shown in FIG. 8, for simplicity). The rack 60 comprises a single, molded housing 52 having a plurality of cylindrical cavities 50 formed adjacent the perimeter of the housing 52.

Figure 9:
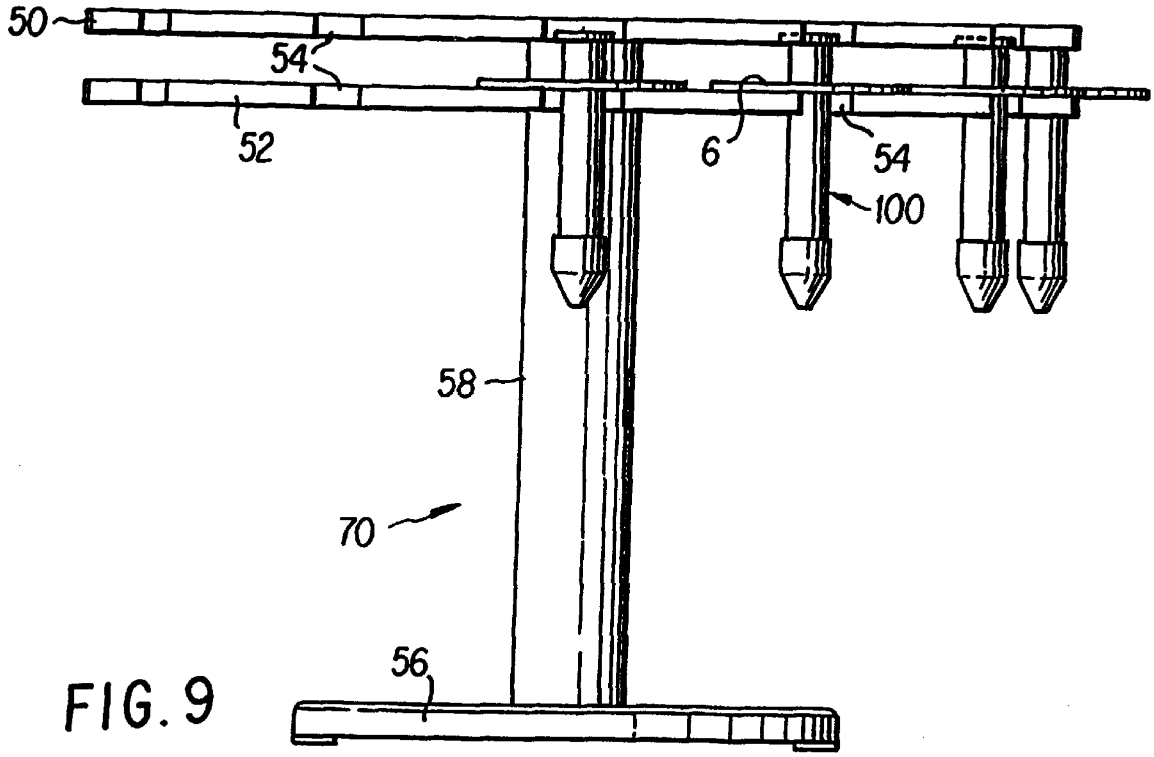
FIG. 9 is a top plan view of another embodiment of a rack, showing a plurality of cavities formed adjacent the perimeter of the cylindrical housing, each holding an applicator.
Figure 10:
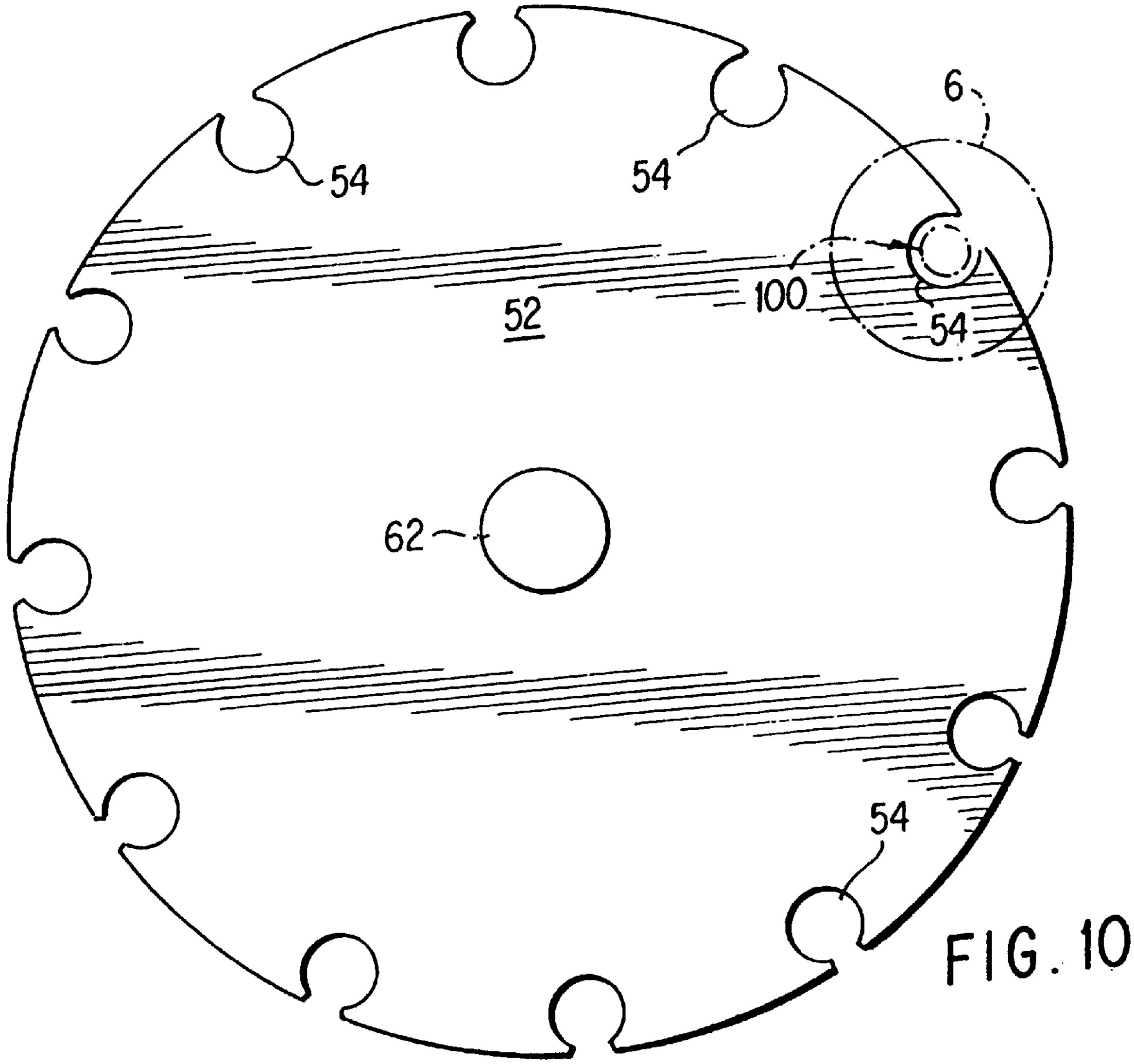
FIG. 10 is a top plan view of another embodiment of the rack of the present invention, showing a plurality of cylindrical cavities formed in the cylindrical housing, with a cavity holding an applicator.
Figure 11:
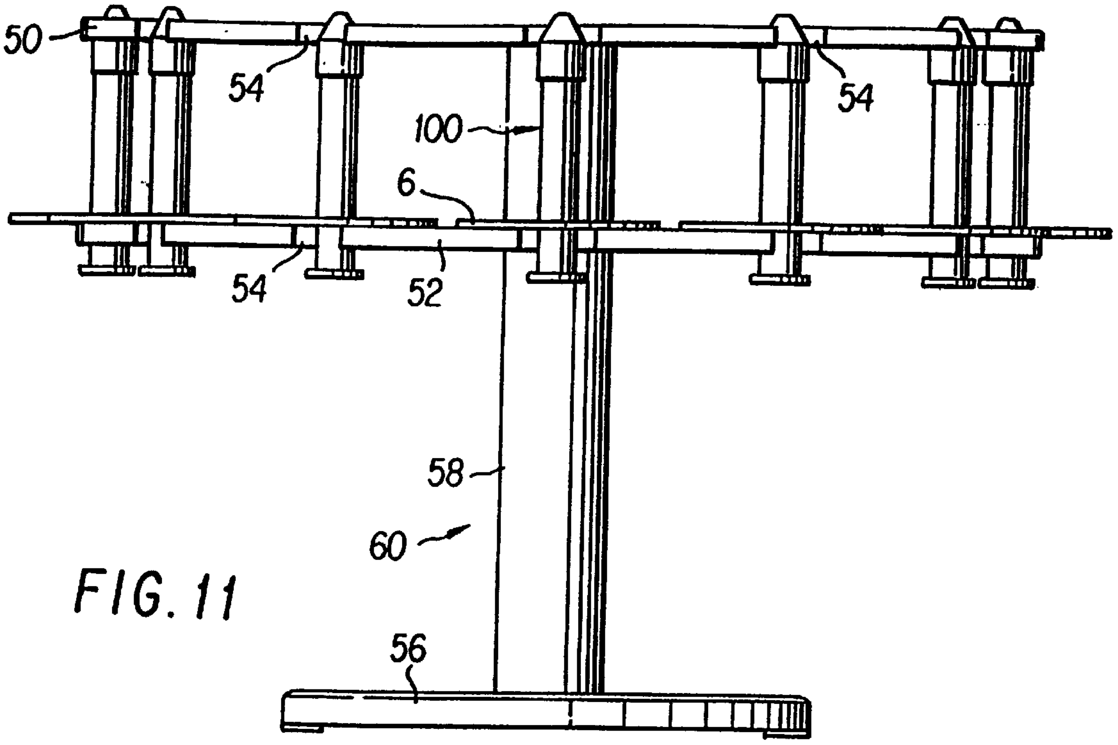
FIG. 11 is a top plan view of another embodiment of the rack of the present invention where the housing is rectangular rather than cylindrical.
Figure 12:
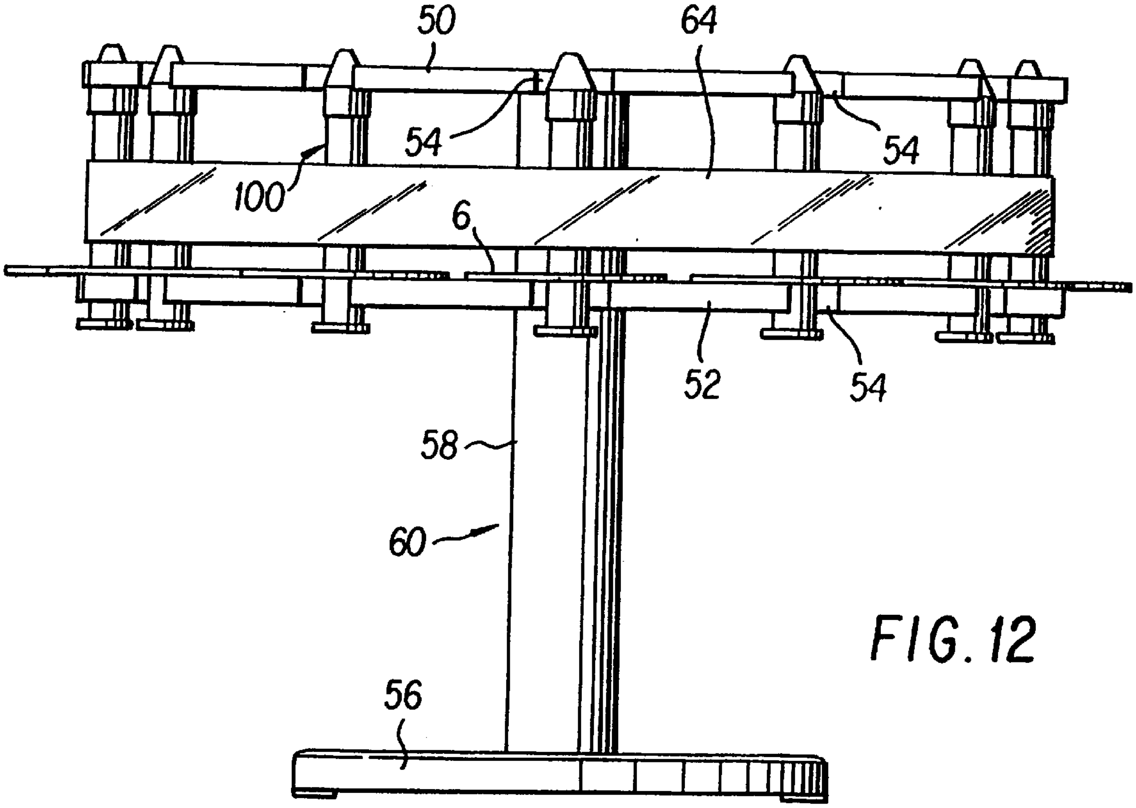
FIG. 12 is a sectional view in a vertical plane, of an elevation of the rack shown in FIG. 11, taken on the line 12—12, looking in the direction of the arrows.

The housing 52 may be cylindrical, as shown in FIG. 8, or it may be rectangular as shown in FIGS. 11 and 12. FIG. 9 shows a top plan view of the rack 60, with an applicator 100 disposed within each cavity. FIG. 10 shows an alternate embodiment of the rack of the present invention. In FIG. 10, rack 70 is formed with a plurality of cylindrical cavities 62 in its top surface 72, each cylindrical cavity 62 being of a sufficient depth and diameter to hold an applicator 100.

A method of applying flowable materials comprises introducing flowable material into the chamber 4 of applicator 100, providing a clean surface onto which flowable material is to be applied, and contacting the surface with the wick 12 of the applicator 100.

A more preferred method further comprises providing an applicator 100 having the valve 24 within the chamber 4 of the applicator 100, with a wick 12 projecting through the discharge opening 14 of the proximal end 22 of the applicator 100, introducing a flowable material into chamber 4 of applicator 100, contacting the surface onto which flowable material is to be applied with the wick 12, and pressing the wick onto that surface, causing the valve 29 to open so the flowable material is discharged from the applicator 100 onto the surface.

In a preferred method, the flowable material introduced into the chamber 4 of the applicator 100 is a non-accelerated aqueous acidic chromium chromate composition. Such a composition does not contain ferricyanide, ferrocyanide, or molybdate. A preferred composition of this nature is described in U.S. Pat. No. 2,851,385, which is expressly incorporated herein by reference.

It has been found to be beneficial to add to the aqueous, acidic conversion coating compositions described in the following Examples an acid-stable surfactant, to facilitate flow and to act as a levelling agent. Generally, the fluorinated surfactants are stable in highly acidic conditions, and the fluorinated surfactants sold under the trademark Fluorad® surfactants are preferred.

The applicator preferably is made of some inert plastic material that can withstand the corrosive nature of the acidic conversion compositions. Generally the lowest useful pH for such compositions is about 1.5. However, it is preferred that the conversion compositions used with the applicator have a pH of less than 4.5, or more preferably, a pH in the range from 1.5 to 4.0.

The applicator is particularly useful in the repair of phosphate conversion coatings used on cold-rolled steel or galvanized steel. Such coating compositions generally are based on phosphate salts, such as those of zinc, manganese, or nickel dihydrogen phosphate, with either bound or unbound fluorine. Such conversion coating compositions also preferably are modified by the addition of an acid stable surfactant, such as a fluorinated surfactant. Conversion coating compositions may also be made using mixtures of the salts, and are also useful in the applicators of this invention.

Such conversion coating compositions can be accelerated by the addition of one or more of hydroxylamine sulfate or sodium nitrite. For example, such compositions based on the use of zinc phosphate, manganese phosphate, or mixtures of these, can be accelerated in this way, and are particularly useful for automobile body coatings. Generally, such coatings can also benefit from the addition of an acid-stable surfactant.

Exemplary conversion compositions used in the automotive industry, particularly on galvanized or cold-rolled steel, are those disclosed in the Miyamoto and Nagatani patents, specifically U.S. Pat. No. 4,838,957, issued Jun. 13, 1989, and U.S. Pat. No. 4,961,794, issued Oct. 9, 1990. These patents are specifically incorporated herein by reference, for their disclosure of conversion compositions and processes for treating galvanized metal surfaces. The compositions and processes of these patents are used in a great majority of the automotive production lines in the United States.

This invention is also particularly useful for preparing aluminum surfaces, such as those on aircraft skins and aircraft parts, aluminum extrusions such as coils, aluminum storm doors, and the like.

Generally, there are two distinct kinds of metal treating solutions, those that require rinsing, and those that do not. Since many of the components of conversion coating compositions are characterized by toxicity and/or high acidity, the compositions that require rinsing may generate wastewater that must be collected and that, with the present federal regulations, present a disposal problem.

For treating aluminum surfaces, among the useful conversion coating compositions are those comprising mixtures of polyacrylic acid and/or esters thereof, and a second ingredient consisting essentially of chromium chromate. Such a solution will not form crystals. Such compositions therefore do not require rinsing and therefore do not create a wastewater disposal problem. After application to a surface in need of repair, by an applicator of the invention, the applied coating composition is simply allowed to dry in place, or force dried.

Generally, for all coating compositions that require rinsing, the addition of a fluorinated surfactant is beneficial, leading to improved performance. For those formulations that do not require rinsing, they may be used with or without the addition of a fluorinated surfactant, but the addition of a fluorinated surfactant generally is beneficial. In addition to improving flow from the applicator and improving levelling characteristics of the composition, the presence of the acid-stable surfactant tends to improve the flow of the coating composition into scratches in a finish that is being repaired. Generally, an effective amount of fluorinated surfactant that is useful is in the range from 0.001% to 0.02%, by weight, based on the overall weight of the composition. Amounts in the range from 0.001% to 0.05% can be used, or even larger quantities, but the larger quantities are not cost effective.

The fluorinated surfactants are available from several sources, generally under different trademarks. The following are exemplary of fluorinated surfactants that are useful in the coating compositions that can be used with the applicator. Generally, these are aqueous compositions that are readily compatible with the conversion coating compositions described in the following Examples.

| Fluorinated Surfactant Materials | |
|---|---|
| Fluorad FC-126 (3M) | 85% Ammonium Perfluorooctanoate (CAS# 3825-26-1) 15% of Lower Perfluoroalkyl Carboxylate Salt (CAS# 6130-43-4, 21615-47-4, & 68259-11-0) |
| Fluorad FC-430 | Fluorinated alkyl ester |
| Fluorad FC-120 | 25% Ammonium Perfluoroalkyl Sulfonate (CAS# 67906-42-7 & 17202-41-4) |
| Zonyl FSN (Dupont) | 40% Perfluoroalkyl Ethoxylate 30% IPA 30% Water |
| Fluowet PL 80 (Hoechst-Celanese) | 50% Fluorophosphoric acid 50% Fluorophophonic acid |

The following example, and other subsequent examples, demonstrate some of the types of solutions that may be used in the practice of the present invention.

| Conversion Coatings for Aluminum and Its Alloys Example 1 | |
|---|---|
| Chromic acid | 6 grams |
| Potassium zirconium fluoride | 2.5 grams |
| Ammonium borofluoride | 7.6 grams |
| Water to make 1 liter. | |

24ST aluminum alloy sheets which is treated in a solution similar to the above formulation has satisfactorily withstood a salt fog exposure in a standard 5% sodium chloride ASTM Salt Fog Cabinet for over 500 hours with only minor pin-point corrosion.

A scratch in the treated sheet is easily and conveniently repaired by filling the chamber of an applicator such as is shown in FIG. 1, with some of the solution described above, then applying it over the scratched surface by using the wick 14 of the applicator. After water rinsing and drying, the coating is as good as new.

The following non-accelerated solutions can also be used as conversion coatings for aluminum and its alloys, and all can be conveniently applied for touch-up of scratches using an applicator of the present invention.

EXAMPLE 2

| | |
|---|---|
| Chromic acid | 8.4 grams |
| Potassium zirconium fluoride | 3.5 grams |
| Boric acid | 6.3 grams |
| Ammonium bifluoride | 4.0 grams |
| Water to make 1 liter. | |

EXAMPLE 3

| | |
|---|---|
| Chromic acid | 8 grams |
| Hydrofluoric acid | 2.0 ml of 48% acid |
| Water to make 1 liter. | |

EXAMPLE 4

| | |
|---|---|
| Ammonium bifluoride | 2.7 grams |
| Chromic acid | 6.0 grams |

-continued

| | |
|---|---|
| $H_2S_nF_6$ (Fluostannic acid) | 3.5 grams |
| Water to make 1 liter. | |

The scratched area should be cleaned before the applicator is used to restore the surface by applying a restorative solution or coating. The cleaning, which forms no part of the present invention, may be carried out by conventional methods. For instance, grease and dirt may be removed by dipping an aluminum part into a mild silicate alkali bath or by the use of an acid bath containing a polar organic solvent, followed by a water rinse. The clean scratched area may then be treated with a solution of the character described, such as the solutions of the above Examples.

In another preferred method of applying flowable materials, the flowable material introduced into the chamber 4 of the applicator 100 is an accelerated aqueous acidic chromium chromate composition. An accelerated aqueous acidic chromium chromate composition contains ferricyanide, ferrocyanide or molybdate. Compositions of this nature are particularly useful for the process of metal cleaning and improving corrosion resistance. Preferred compositions of this nature are described in U.S. Pat. Nos. 2,796,370, describing a useful ferricyanide accelerated chromium chromate composition, and 4,146,410, describing a useful molybdate accelerated chromium chromate composition, which patents are expressly incorporated herein by reference.

The coatings applied in the following examples exhibit enhanced corrosion resistance. Scratches that expose the same metal surface can readily be repaired by using the methods and applications of this invention.

EXAMPLE 5

| Use of Accelerated Chromate Coatings; Ferricyanide | | |
|---|---|---|
| Chromic acid | g./l | 5 |
| Potassium ferricyanide | g./l | 2.5 |
| Sodium fluosilicate | g./l | 2.5 |
| Sodium fluoborate | g./l | 5 |
| Temperature | ° F. | 70 |
| Immersion time | | 5 minutes |
| pH | | 1.5 |

The general temperature range of 32° to 160° F. is applicable to the above composition. A temperature range of 70° F. to 90° F. is preferred. The application time can vary from five seconds to about five minutes or over, depending upon the color or thickness of coating desired.

EXAMPLE 6

Use of Accelerated Chromate Coatings; Paint Receptivity

In this preferred embodiment, a concentrate is prepared utilizing commercially available materials, by combining the materials in water to form the concentrate. The concentrate is prepared from the following ingredients in the amounts specified:

| Material | Grams/liter |
|---|---|
| $CrO_3$ | 40.0 g. |
| ZnO | 7.6 g. |
| $HnO_3$ 38° Be | 68.0 g. |

-continued

| Material | Grams/liter |
|---|---|
| $H_2SiF_6$ as a 23% solution | 91.2 g. |
| Molybdic acid as 84% $MoO_3$ | 9.5 g. |
| Water | balance |

From this concentrate a bath is prepared by diluting the concentrate with water to make a 5% (by volume) solution. The final solution pH is about 1.5.

A five stage commercial aluminum coil coating line consisting of four immersion tanks followed by a fresh water spray final rinse is made operational. The line speed is adjusted to vary to between no more than about 25 to 100 feet per minute. Utilizing this set-up aluminum coil stock of various alloy compositions, including the type commonly known as 3003, 3105, 5005, 5052 and "utility stock" is treated as follows.

The coil line is started and the coil is first cleaned in both stages 1 and 2 by immersion in an acidic metal cleaning solution, as is well known in the art and which forms no part of this invention. Following the two cleaning stages, the coil is processed in stage 3, which is an immersion water rinse stage. The clean coil then proceeds to stage 4 where it is contacted, by immersion, with the above described bath solution for various time periods of from about 10 to about 30 seconds. The pH of the bath solution is maintained at about 1.5 and the bath temperature is kept at approximately 120° F. Following treatment with the composition of this invention, the aluminum coil is subjected to a final water spray rinse after which the metal is dried and painted.

Analysis of the appearance and properties of metal treated in the above fashion indicates that the final product is in all ways comparable to metal produced by prior art ferricyanide containing processes. Mechanical damage to the surface of the coated aluminum alloy stock is readily repaired by the use of the immersion solution in a applicator, according to the present invention.

In another preferred method, the flowable material introduced into the chamber 4 of the applicator 100 is an aqueous acidic chromium phosphate composition. Compositions of this nature are particularly useful for the process of metal cleaning and improving corrosion resistance. A preferred composition of this nature is described in U.S. Pat. No. 2,438,877, which is expressly incorporated herein by reference.

The use of a highly corrosive bath for imparting corrosion resistance to aluminum and aluminum alloys, where aluminum is the principal ingredient, is illustrated by the use of baths containing ions of phosphate, fluoride, and hexavalent chromium, at a low pH, often referred to as chrome phosphate compositions.

The solutions described in the preceding two paragraphs can readily be used in touch up work using the hand-held applicator of the invention. Since these solutions are corrosive, the applicator, when made of inert plastic material, is a convenient place for storing a small amount of solution when the applicator is not in use. The guard structure protects clothing and helps ensure that a filled applicator is properly stored.

EXAMPLE 7

An illustrative chrome phosphate bath may contain, where the ions are present in amounts stoichiometrically equivalent to:

| | Grams per liter |
|---|---|
| Fluoride | 2.0 to 6.0 |
| Chromic acid ($CrO_3$) | 6.0 to 20.0 |
| Phosphate ($PO_4$) | 20.0 to 100.0 |
| pH | 1.7 to 1.9 |

The ratio of fluoride to dichromate, expressed as $F{:}CrO_3$, is between 0.18 and 0.36.

All of the foregoing coating compositions require rinsing, for good results.

No-Rinse Compositions

EXAMPLE 8

| CHROMIUM | % by wt. |
|---|---|
| Mixed Chromium compounds | 0.5% |
| Acrysol A-1, a water soluble solution of polyacrylic acid | 0.5% |

The mixed chromium compounds are prepared in accordance with U.S. Pat. No. 3,063,877, which is incorporated herein by reference. This composition can be used in an applicator on all metals for repairing damaged conversion coatings. No rinsing is required; the coating is simply permitted to dry, or it can be force dried at 150° F. or higher.

As with essentially all of the conversion coatings, adequate ventilation should be provided when these coatings are being poured, used, and dried. Operators should avoid inhaling the vapors. If an air stream is used to promote drying, its velocity should be limited to 3,000 fpm or less, to avoid disruption of the film.

EXAMPLE 9

Non-Chromate Acidic Aqueous Composition

A typical five percent operational bath made up from a concentrate using deionized or distilled water may contain the essential ingredients in the amounts indicated below:

| | |
|---|---|
| polyacrylic acid (added as ACRYSOL A-1) | 4.13 grams/liter |
| $H_2TiF_6$ | 2.0 grams/liter |

EXAMPLE 10

In another preferred method of applying flowable materials, the flowable material introduced into the chamber 4 of the applicator 100 is a zinc phosphate composition. Such compositions are most useful for coating cold-rolled steel and galvanized metals. A preferred composition of this nature is described in U.S. Pat. No. 2,438,957, which is expressly incorporated herein by reference.

General

In another preferred method of applying flowable materials, a Fluorad® fluorochemical surfactant is added to an aqueous chemical conversion coating composition, such as those previously mentioned. Fluorochemical surfactants lower the surface tension characteristics of these types of aqueous conversion coatings. A particular advantage of fluorochemical surfactants is that they have excellent chemical and thermal stability even in the presence of strong oxidizing agents such as chromates, even at low pH levels, making them particularly useful when using aqueous chromate-containing compositions.

Examples of these surfactants are sold under the tradenames Fluorad FC-93 and Fluorad FC-120, by the 3M Company. Additional examples of these surfactants are sold as Zonyl FSA and Zonyl FSC surfactants by the Dupont Co. It has been found that it is advantageous to add from about 0.0001% to about 3% of a fluorochemical surfactant (by volume) to any aqueous acidic composition to improve the dispensing and coating characteristics, or flowability of the composition, while improving the shelf-life of the dispenser because of the stability of the fluorochemical surfactants. Additionally, it has been found that it is advantageous to add from about 0.01% to about 0.1%, or preferably from 0.01% to 0.05%, of a fluorochemical surfactant (by volume) to any aqueous acidic composition. Because the fluorochemical surfactant lowers surface tension, an applied film of a solution containing it penetrates into scratches more readily, and also flows to form a film of a more uniform thickness, i.e., the coating is self-levelling.

In summary, it can be said that the present invention provides industry with an improved applicator for flowable materials. The applicator provides a safer, more effective and efficient apparatus and method for applying flowable materials to surfaces; and more particularly, of applying rust-proofing and conversion coatings to metals. Further, the present invention provides an improved storing, transporting and dispensing rack for applicators.

It will be recognized that the applicator must be constructed of materials that do not react with the chemical solution that is to be applied.

In use, the uncovered dispensing tip of a filled applicator is placed in contact with the surface to be coated in the same manner that a marking pen is used to apply a mark or a highlight. The solution in the reservoir feeds to the tip, as needed, when the tip is placed in contact with or rubbed on the surface.

The applicator and method have been tested using a MIL-C-5541E conversion coat testing specification. It has been shown that the applicator and method apply a minimal amount of conversion coating solution to the surface of the treated parts. During the chemical reaction process, the no-rinse type conversion coating solution dries on the surface leaving substantially no wasted solution.

Thus, the present invention eliminates the problems associated with conventional touch-up repair of conversion coat treated aluminum surfaces, and provides for a simple means to touch up and repair scratched parts with chemical solutions. The present invention also reduces the repair cycle time in touching up and repairing scratched parts with chemical solutions, such as conversion coat-treated aluminum.

The applicator reduces solution waste by up to 99%, and the only waste material thrown away is in an expired or empty applicator.

According to our preferred embodiment of the applicator, its distal end is welded shut. The tubular housing is inverted on the distal end and the proximal end is open. Filling of the chamber in the housing takes place by pouring the conversion coating into the chamber in the housing. Then, the Flocon® valve assembly is pressed forward within the housing to make a leak proof seal.

Thus there has been described an applicator for use in applying hazardous chemicals to scratched surfaces, and more particularly, to a method and applicator that may be used in touching up conversion coated aluminum surfaces, for example. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method for dispensing an acidic conversion coating with steps comprising:

introducing through a port in a reservoir chamber of a handheld applicator an aqueous conversion coating composition that exhibits a pH within the range of 1.5–4.5 and includes 0.0001–3 vol % of an acid stable fluorinated surfactant; and closing said port with an applicator wick, wherein said conversion coating composition can be dispensed from said reservoir through said wick.

2. The method of claim 1 wherein said conversion coating composition comprises an aqueous solution of:

a) polyacrylic acid and esters thereof, and b) at least one acid selected from the group consisting of fluozirconic, fluotitanic, and fluosilicic acids.

3. The method of claim 1 wherein said conversion coating composition comprises an aqueous solution of:

a) polyacrylic acid and esters thereof, and b) chromium chromate.

4. The method of claim 1 wherein said conversion coating composition further includes zinc phosphate.

5. The method of claim 1 wherein said conversion coating composition further includes chromium chromate.

6. The method of claim 5 wherein said conversion coating composition further includes an accelerator for said chromium chromate selected from the group consisting of ferricyanide, ferrocyanide, and molybdate.

7. The method of claim 1 wherein said conversion coating composition further includes chromium phosphate.

8. The method of claim 1 wherein said conversion coating composition includes 0.01–1vol % of said fluorinated surfactant.

9. The method of claim 1 wherein said conversion coating composition includes 0.01–0.05 vol % of said fluorinated surfactant.

10. The method of claim 1 wherein said fluorinated surfactant is selected from the group consisting of (a) a mixture of 85% ammonium perfluorooctanoate and 15% lower perfluoroalkyl carboxylate salt, (b) a fluorinated alkyl ester, (c) ammonium perfluoroalkyl sulfonate, (d) perfluoroalkyl ethoxylate, and (e) a mixture of 50% fluorophosphoric acid and 50% fluorophosphonic acid.

11. The method of claim 1 wherein said wick is made from polyethylene or polyester.

12. The method of claim 1 wherein said applicator wick further includes a valve between said wick and said reservoir that controls contact between said wick and said coating composition in said reservoir.

* * * * *

UNITED STATES PATENT AND TRADEMARK OFFICE
CERTIFICATE OF CORRECTION

PATENT NO. : 6,048,921
DATED : April 11, 2000
INVENTOR(S) : Robert A. White et al.

It is certified that error appears in the above-identified patent and that said Letters Patent is hereby corrected as shown below:

Column 1,
Line 9, correct the "Cross-Reference to Related Application" data by deleting "which is a divisional of application Ser. No. 08/038,033, filed March 29, 1993 which is a continuation of application Ser. No. 07/796,154 filed Nov. 21, 1991.", so that the "Cross-Reference to Related Application" data reads:

-- This is a continuation of application Ser. No. 08/487,336, filed Jun. 7, 1995, now abandoned, which is a division of application Ser. No. 08/363,116, filed Dec. 23, 1994, now abandoned.--

Likewise, on the title page of the patent, correct the paragraph under "Related U.S. Application Data" to read:

--Continuation of application No. 08/487,336, Jun.7,1995, abandoned, which is a division of application No. 08/363,116, Dec. 23, 1994, abandoned.--

Signed and Sealed this

Nineteenth Day of June, 2001

*Attest:*

Nicholas P. Godici

NICHOLAS P. GODICI

*Attesting Officer* *Acting Director of the United States Patent and Trademark Office*